United States Patent [19]

Anderson et al.

[11] Patent Number: 5,268,101
[45] Date of Patent: Dec. 7, 1993

[54] MICROPROBES ALUMINOSILICATE CERAMIC MEMBRANES

[76] Inventors: Marc A. Anderson, 2114 Chadbourne Ave., Madison, Wis. 53705; Guangyao Sheng, 45 N. Orchard St., Madison, Wis. 53715

[21] Appl. No.: 773,170
[22] Filed: Oct. 8, 1991
[51] Int. Cl.$^5$ .................................................. C03C 11/00
[52] U.S. Cl. ................................... 210/510.1; 264/56; 501/12
[58] Field of Search ................ 210/510.1; 501/12; 264/56, 45.1, 41, 59

[56] References Cited

U.S. PATENT DOCUMENTS

| | | |
|---|---|---|
| 3,892,580 | 7/1975 | Messing . |
| 4,764,357 | 8/1988 | Sherif et al. . |
| 4,800,051 | 1/1989 | Yan . |
| 4,801,399 | 1/1989 | Clark et al. . |
| 4,929,406 | 3/1990 | Abe et al. . |
| 5,006,248 | 4/1991 | Anderson et al. . |

FOREIGN PATENT DOCUMENTS

88/02537 2/1989 PCT Int'l Appl. .

OTHER PUBLICATIONS

Leenaars, A. F. M., et al., "Porous alumina membranes," Chemtech 560–564 (Sep. 1986).
Anderson, M. A., et al., "Titania and Alumina Ceramic Membranes," 39 *J. Memb. Sci.* 243–258 (1988).
Asaeda, M. and Du, L. D., "Separation of Alcohol/Water Gaseous Mixtures by Thin Ceramic Membrane," *Chem. Eng. Japan* 19[1]: 72–77 (1986).
Chen, K. C., et al., "Sol-Gel Processing of Silica: I. The Role of the Starting Compounds," *J. Non-Crystalline Solids* 81: 227–237 (1986).
Johnson, D. W., "Sol-Gel Processing of Ceramics and Glass," *Am. Ceram. Soc. Bull.* 64[12]: 1597–1602 (1985).
Leenaars, A. F. M. and Burggraaf, A. J., "The Preparation and Characterization of Alumina Membranes with UltraFine Pores Part 4. Ultrafiltration and Hyperfiltration Experiments," *J. Memb. Sci.* 24: 261–270 (1985).
Yoldas, B. E., "A Transparent Porous Alumina," *Am. Ceram. Soc. Bull.* 54[3]: 286–288 (1975).
Yoldas, B. E., "Alumina Sol Preparation from Alkoxides," *Am. Ceram. Soc. Bull.* 51[3]: 289≧390 (1975).
Yoldas, B. E., "Preparation of Glasses and Ceramics from Metal-Organic Compounds," *J. Mater. Sci.* 12: 1203–1208 (Jun. 1977).

*Primary Examiner*—Frank Sever

[57] ABSTRACT

Methods have been developed to make mixed alumina-silicate and aluminosilicate particulate microporous ceramic membranes. One method involves the making of separate alumina and silica sols which are then mixed. Another method involves the creation of a combined sol with aluminosilicate particles. The resulting combined alumina and silica membranes have high surface area, a very small pore size, and a very good temperature stability.

10 Claims, 1 Drawing Sheet

MICROPROBES ALUMINOSILICATE CERAMIC MEMBRANES

FIELD OF THE INVENTION

The present invention relates to the field of ceramic membranes in general and relates in particular, to the field of metal oxide ceramic membranes with small pore size, referred to here as microporous ceramic membranes.

BACKGROUND OF THE INVENTION

Ceramic membranes have a variety of industrial and scientific uses, the most common of which is use in separation processes. Organic membranes are often currently used in industry for separation processes, but ceramic membranes offer several advantages over organic membranes. Ceramic membranes are more resistant than organic membranes to organic solvents, chlorine, and extremes of pH. Ceramic membranes are also inherently more stable at high temperatures, thus allowing more efficient sterilization of process equipment than is possible with organic membranes. Ceramic membranes are generally quite resistant to microbial or biological degradation, which can occasionally be a problem with organic membranes. Ceramic membranes are also more mechanically stable under high pressures.

The mechanism of operation and types of separations which can be achieved by ceramic membranes are discussed in general by Asaeda et al., *Jour. of Chem. Eng. of Japan*, 19[1]: 72-77 (1986). At least one line of ceramic filters is currently marketed under the trade name "Ceraflo" by the Norton Company of Worcester, Mass.

Ceramic membranes may be formed in particulate or polymeric manners. Anderson, et al., *J. Memb. Sci* 39: 243-258 (1988), describes different methods of making both particulate and polymeric sols from transition metal oxides. In general, particulate membranes have a smaller average pore diameter and a narrower pore size distribution as compared to polymeric membranes.

Particulate ceramic membranes are typically formed through a process beginning with metal-organic compounds. The compounds are hydrolyzed to form small metal oxide clusters which in turn aggregate to form metal oxide particles. The particles are fused into a unitary ceramic material. The gaps between the fused particles form a series of pores in the membrane.

The creation of these metal oxide ceramic membranes is generally conducted through a sol-gel procedure. Usually, the metal oxide is initiated into the process as a metal alkoxide solution. The metal is hydrolyzed to metal hydroxide monomers, clusters or particles, depending on the quantity of solvent used. The insoluble metal oxide particles are then peptized by the addition of an acid which causes the particles of the metal oxide to have a greater tendency to remain in suspension, presumably due to charges acquired by the particles during the peptizing process.

Such a sol can be evaporated to form a gel, which is a semi-solid material. Further evaporation, and then sintering, of the gel results in a durable rigid material which can either be formed as an unsupported membrane or as a supported membrane coated onto a substrate. This substrate can be either porous or non-porous and either metallic or non-metallic, depending on the particular application.

Two current limitations on the use of ceramic membranes are the materials used to fabricate the membranes and the membrane pore size and range. With regard to the composition of the membranes, ceramic membranes have been created using many materials. For example, Leenaars et al., *Jour. of Membrane Science*, 24: 261-270 (1985), report the use of the sol-gel procedure to prepare supported and unsupported alumina membranes. However, the sol-gel process used had inherent lower limits as to the size of the particles that could be produced in the sol thus making a lower limit on the size of the pores in the membranes. Ceramic membranes composed of titania, zirconium and other metal oxides have also been reported.

Investigators have investigated alumina membranes previously. In particular, Yoldas conducted significant research on the fabrication of gamma-alumina membranes made by a sol-gel process. Yoldas was able to achieve a relatively small particle size in the sols and was able to achieve porous membranes. Yoldas, *Jour. Mat. Sci.*, 12:6, pp. 1203-1208 (1977). In general, however, the method of Yoldas did not permit sufficiently fine control of the sol-gel process to result in useful uniformity of the particles, and the resulting membranes, so as to achieve useful filtration materials. For example, in the transparent alumina membranes Yoldas reported that he was able to achieve materials that had small pores, having a radius less than 50 Angstrom, but only in conjunction with the materials which had "larger river-like pores" having a significantly higher radius and contributing significantly to the porosity of the material. Yoldas, *Cer. Bull.*, 54:3, 286-288 (1975).

Yoldas also investigated the manufacture, through sol-gel processes, of mixed alumina and silica materials. One class of materials which Yoldas prepared were alumina-siloxane derivatives which formed polymeric cross-linkages making polymeric, rather than particulate, ceramic materials. Yoldas was also able to make several large monolithic glass samples of varying compositions of silica and alumina that did retain some porosity and high surface area, as described in the article in *Jour. Mat. Sci.*, supra. Yoldas did not report any ability to make particulate aluminosilicate porous membranes, or the ability to make aluminosilicate membranes having high porosity with exceedingly small pore sizes approaching those of the alumina membranes which he had made.

In order for the materials to be useful for filtration, the pore size of the material is preferably within a relatively narrow range, so that larger species are excluded from the material passing through the filtrate. It is also useful to achieve pore sizes of less than 100 Angstroms, which are useful for many separation applications. Examples of such applications include ultrafiltration, reverse osmosis, molecular sieving and gas separation. The ability to achieve, materials having a defined pore size which is even less than 20 Angstroms has significant additional advantage.

SUMMARY OF THE INVENTION

The present invention is a method for creating aluminosilicate ceramic membranes and the membranes made by the method. The method involves the creation of separate stable and controlled sols of alumina and silica particles created by a peptizing process. The sols may then be combined. Alternatively, a combined aluminosilica sol can be created. The sol may then be heated. The clear sol may then be evaporated, to form a xerogel, which may be fired to produce transparent particulate aluminosilicate ceramic membranes having mean pore sizes less than 50 Angstroms and a very tight distribution of pore size.

It is an object of the present invention to create aluminosilicate porous ceramic membranes having small pore sizes so that the membranes may be used for separation and catalytic processes.

It is yet another object of the present invention to create multiple methods for creating such membranes through a controlled sol-gel process.

It is another object of the present invention to provide a method for producing an aluminosilicate porous ceramic membrane in which the sizes of the pores are constant within a relatively narrow range.

Other objects, advantages and features of the present invention will become apparent from the following specification.

DETAILED DESCRIPTION OF THE INVENTION

Figure 1:
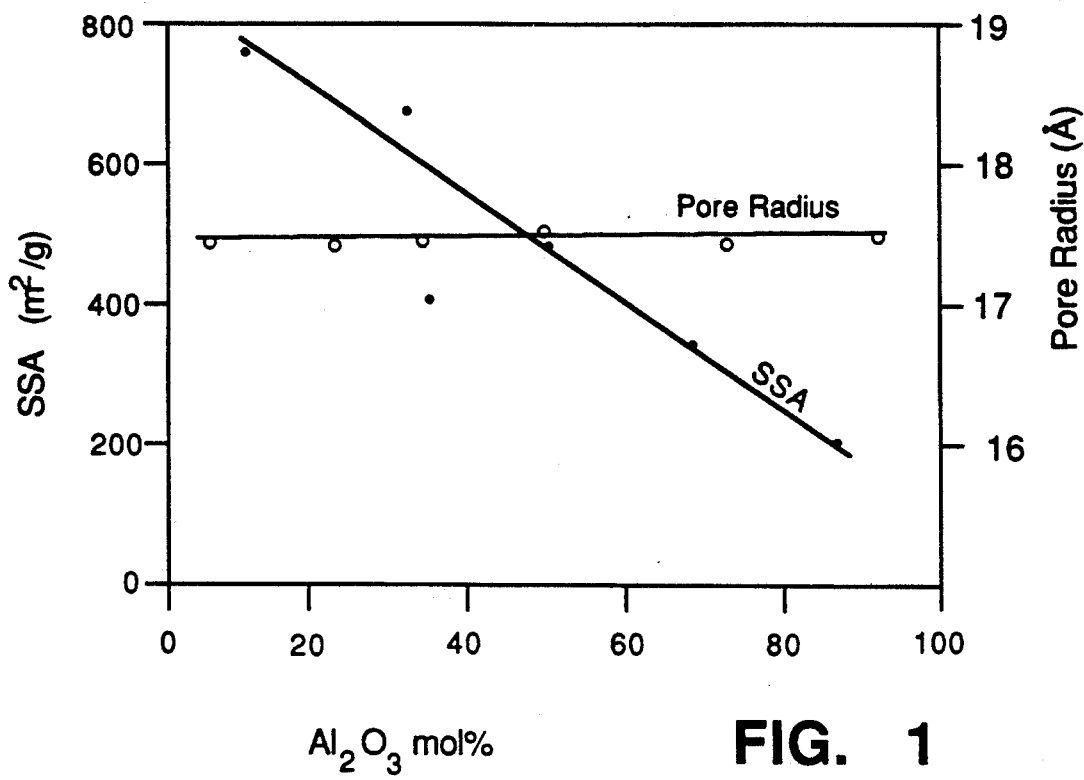
FIG. 1 is a graphic representation of the relationship between surface area and ratio of alumina to silica in an aluminosilicate membrane.

The method of the present invention requires the hydrolysis of separate aluminum and silicon alkoxides or the hydrolysis of a mixed aluminum and silicon alkoxide, under conditions so as to favor the formation of extremely small mixed alumina and silica particles, or particles of aluminosilicate, in the resulting colloidal suspension, or sol. According to the theory of homogeneous nucleation of solids in liquid dispersions, a low temperature hydrolysis of a metal alkoxide should lead to smaller, more numerous, particles in the colloidal suspension. In the alumina colloidal suspension system, the use of an acidic hydrolysis increases the hydrolysis rate of the aluminum alkoxide, and therefore also tends to form smaller nuclei or particles in the sol. The methods described here are capable of producing such small particle sols which can be dried, and sintered into ceramic microporous membranes of fused mixed alumina and silica particles or of fused aluminosilicate particles.

Therefore, both methods of the present invention require the hydrolysis of the appropriate alkoxides under conditions so as to favor the formation of extremely small particles in the resulting sol. This can be done either by separately making alumina and silica particles in a suspension, and then mixing the suspensions, or it can be done by the hydrolysis of aluminum and silicon alkoxides in a common solution. With either alternative, the pH of the solution must be carefully controlled, so as to achieve suspension of the resulting particles in the solution so that a stable sol can result.

The first method begins with the preparation of separate alumina and silica sols. The alumina ($Al_2O_3$) sols are boehmite sols which are prepared from a starting metal alkoxide such as aluminum tri-sec-butoxide (ATSB) (Aldrich). In past work with alumina materials, the metal hydroxides produced by hydrolysis of the aluminum alkoxide with hot water (greater than 80° C.) were peptized with nitric acid to form stable sols. The hydrolysis of ATSB at temperatures below 80° C. ultimately produces bayerite, a material that can not be peptized. However, it has been found that boehmite sols can be produced by first adding ATSB to deionized water containing a small concentration of nitric acid, and then after hydrolysis proceeds for approximately 10 minutes, the solution is heated to its boiling point and held at that temperature. The result is a stable boehmite sol which may be cloudy. If cloudy, the resulting sol may be centrifuged and the supernatant decanted.

Silica sols may be created through a starting material such as tetraethyl orthosilicate (TEOS, 98%, Aldrich). To prepare such a silica sol, the TEOS is added to alkaline water at room temperature and stirred vigorously. The initial two-phase system created ultimately becomes a clear sol. The sol may then be dialyzed against water to remove the by-product alcohol and most of the ammonia. The dialysis is continued, replacing the water every few hours, until the sol reaches a pH value between 8 and 9.

Once both alumina and silica sols are separately prepared, a diphasic membrane may be prepared by starting with the two sols and mixing the boehmite and silica sols to the appropriately desired ratio of $Al_2O_3$ to $SiO_2$. Before the two sols may be mixed, the pH of the silica sol, which is typically near 8, must be adjusted to a value between 3.0 and 3.5, by the addition of an acid such as nitric acid, so that its pH value becomes similar to that of boehmite sol. The two sols may then simply be mixed. The sol thus created may then be dried at room temperature to form a xerogel. Such xerogels, once finally dried, may subsequently be fired at temperatures up to 500° C. to produce mixed alumina-silica microporous ceramic membranes.

The alternative process for creating mixed alumina and silica membranes involves the creation of actual particulate aluminosilicate membranes. The membranes formed are particulate in the sense that they are composed of fused aluminosilicate particles. Aluminosilicate sols are prepared in which the molecular or atomic scale mixing of alumina and silica can occur to give a single-phase solid. To prepare a membrane using this procedure, a silicon alkoxide, such as teramethyl orthosilicate (TMOS) used in varying concentrations dissolved in butanol, and ATSB, also dissolved in butanol, are mixed in the desired aluminum to silicon ratio and allowed to react for a suitable time period, such as an hour. An equal quantity of butanol, containing a small amount of water and concentrated nitric acid, is dropped into the mixed alkoxide system slowly at room temperature. The final resulting sol, which preferably contains about one mole of water and 0.07 moles of the concentrated nitric acid per mole of total alkoxide (TMOS and ATSB), is then heated to the boiling point for approximately two hours. The resulting cloudy solution is centrifuged to obtain a transparent sol. This transparent sol can be slowly dried at room temperature to form a xerogel. This xerogel can then be completely dried at room temperature, and subsequently fired at temperatures up to 500° C. (or higher) to achieve a microporous aluminosilicate membrane.

Both of these methods will produce membranes of mixed alumina and silica materials. In the aluminosilicate system, the particles of the membrane are atomic-level combinations of aluminum and silicon oxides. Using the other procedure, separate particles of alumina and silica oxides are fused in a common particulate membrane creating a continuous fused ceramic material of mixed alumina and silica particles. Neither process produces polymeric materials in which there are polymeric linkages throughout the material.

Such microporous ceramic materials have useful porosity such that they can be used for catalytic or separation processes. The pore sizes of the materials are determined by the size of the particles in the sol which are fused together to form the membranes. In essence, if the particles are joined in a close-packing model, the pores of the material are simply determined by the spaces between the spherical particles. Thus, the smaller the particle, the smaller the pores. By tightly controlling the sol processing, the particles can be created in a relatively uniform size distribution, resulting in a membrane which has a relatively tight range of mean pore sizes. Such materials are particular useful for separation processes including ultrafiltration, reverse osmosis, and gas separation. Pore sizes in the membrane of less than 100 Angstroms, which can readily be achieved, permits effective use in ultrafiltration. Materials with pore sizes less than 20 Angstroms, which have also been made, offer utility particularly for gas separation and molecular sieving.

EXAMPLES

Mixed Alumina Silica Membranes

In producing mixed alumina-silica ($Al_2O_3$ - $SiO_2$) membranes, separate sols of boehmite and silica particles were created.

To prepare a boehmite sol, ATSB was added to cold deionized water containing a small quantity of concentrated nitric acid. 3.6 liters of water and 0.07 moles of concentrate nitric acid were added per mole of ATSB used to prepare the sol. After the reactants were mixed and hydrolyzed for 10 minutes, the solution was then heated to its boiling point and held at that temperature for two hours. The resulting boehmite sol was cloudy. The sols were then centrifuged and the supernatant was decanted. The resulting clear sol was what was added to the corresponding silica sol.

The silica sols were prepared by adding 4.5 ml of TEOS to alkaline water at room temperature. The alkaline water was created by mixing 1 ml of concentrated ammonium hydroxide into 30 ml of deionized water. The mixture thus created was stirred vigorously for one to two hours. During this mixing period, the initial two-phase solution slowly became a clear sol. This resulting clear sol was then dialyzed against ultrapure water using a SpectraPore membrane with a molecular weight cut-off of 3500, to remove the by-product alcohol and most of the ammonia. The dialysis was continued, periodically replacing the ultrapure water every few hours, until the sol reached a pH of between 8 and 9.

The two sols were then ready for mixing. Before mixing, the pH of the silica sol, which is in excess of 8, was adjusted to a value of between 3.0 and 3.5 by the addition of an appropriate amount of nitric acid. The purpose for this was to adjust the pH of the silica sol to that of the boehmite sol. The two sols were then mixed. The resulting mixed sol was then slowly dried by controlled evaporation at room temperature to form a stable xerogel. The xerogels, when completely dried, were heated at 2° C. per minute up to a typical firing temperature of 500° C., and were held at the maximum temperature for approximately five hours.

Although the particles in the two sols which were mixed have opposite charges before they are mixed, no precipitation is produced by mixing of the two sols. However, the gelling time for the mixed sol depends on the composition of the sol. A sol with a 1:1 molar ratio of $Al_2O_3$ to $SiO_2$ has the shortest gelling time, as short as several minutes. Higher ratios of either aluminum to silicon or silicon to aluminum produce longer gelling times. This phenomenon is likely to be related to electrostatic attraction between the particles.

Shown in FIG. 1 is the relationship between the membrane composition on the specific surface area and on the mean pore diameter, of the membranes produced through the process. The specific surface areas seem to decrease linearly as the ratio of alumina to silica increases, although the mean radius of the pores of all samples remains constant at about 17.5 Angstroms. In general, the surface area and the molar percent alumina are functions of one another. The data to date suggests the following relationship: surface area equals 866.4 minus 745.5 times molar percent $Al_2O_3$.

The one replicate that did not fit within this rule was the sample containing 34.5 molar percent $Al_2O_3$. The specific surface area of this sample was significantly lower than predicted by the above equation. An explanation for this anomaly is unknown, but agrees with previous reports of alumina-silica gels that have anomalously low surface areas in the same vicinity of ratios between alumina and silica particles. In general, surface areas in excess of 100 $m^2/g$ were readily obtainable in materials having mean pore radii under 20 Angstroms.

Figure 2:
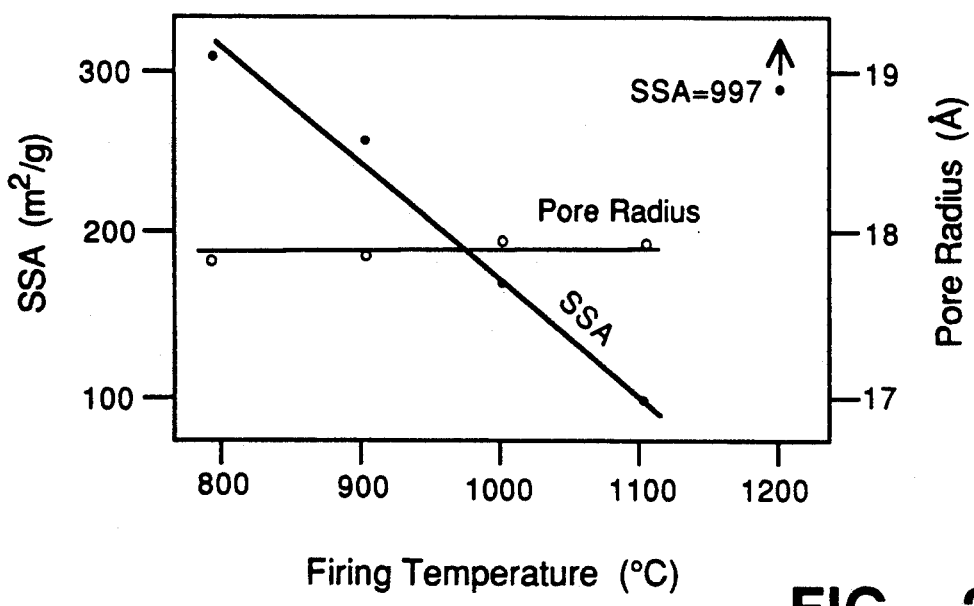
FIG. 2 is a graphic representation of the relationship between surface area and firing temperature for an aluminosilicate membrane of a particular composition.

Shown in FIG. 2 is a graphical illustration of the relationship between firing temperature and the specific surface area and mean pore radius of the pores in the membrane with a mullite composition (60% molar $Al_2O_3$). As this chart illustrates, these materials can be fired to temperatures which greatly exceed the firing temperatures of other microporous metal oxide ceramic materials, while still maintaining significant porosity and a high specific surface area. Below 1200° C., the specific surface area decreases linearly as the firing temperature increases, while the mean radius of the pores of the sample remains constant at about 17.5 Angstroms. Nevertheless, the surface area still exceed 100 square meters per gram, up to a firing temperature of 1100° C. This represents a high temperature tolerance for materials of this class.

At temperatures above 1200° C. with this composition, the $Al_2O_3$ reacts with the $SiO_2$ to form mullite, leading to a significant decrease in specific surface area as well as an increase in the size of the pores. X-ray diffraction spectrum analysis of the mixed membrane indicates that there are two parts, a poorly crystallized silica and several sharp peaks from gamma-alumina particles. This indicates that the mixed membranes are diphasic and consist of separate alumina and silica particles sintered together until the membranes are heated to above 1200° C.

Aluminosilicate Membranes

To prepare aluminosilicate sols, quantities of tetramethyl orthosilicate (TMOS) and ATSB were mixed in butanol. The relative proportions between the TMOS and the ATSB were varied. Each of the alkoxides was separately dissolved in butanol, and then the two butanol solutions were themselves mixed. The mixture was then allowed to react for approximately one hour. Separately, an equal quantity of butanol was prepared containing a small amount of ultrapure water and concentrated nitric acid. The amount of water and nitric acid was calculated so that the final solution contained one mole of water and 0.07 moles of concentrated nitric acid per mole of total alkoxide. The aliquot of butanol containing the water and nitric acid was then dripped into the combined alkoxide solution slowly at room temperature. The final solution was then aged by stirring at the boiling point for approximately two hours. The resulting cloudy solution was then centrifuged to obtain a transparent sol. The resulting sol was slowly dried at room temperature to remove the alcoholic solvent therefrom. The result was a xerogel. The xerogel was then heated with the heat increasing at a ramp rate of 2° C. per minute up to a typical maximum of 500° C. after which it was held at this temperature for five hours.

The results of the following Table 1 indicate the various ratios of alumina to silica in the mixed aluminosilicate system and the differences in specific surface area (SSA) and pore radius achieved through various relative proportions of alumina and silica molecules.

TABLE 1

| $Al_2O_3$ to $SiO_2$ ratio | 5.6:1 | 4.4:1 | 4.2:1 | 1.5:1 |
|---|---|---|---|---|
| Surface Area (SSA) $m^2/g$ | 217 | 384 | 456 | 472 |
| Pore Radius Angstroms | 22.1 | 21.5 | 21.5 | 17.2 |

The results indicate that for a wide variety of relative ratios of alumina to silica, high surface areas and very small radius pores are maintained. The surface area is particularly exceptional and extraordinarily high, thereby making the materials particularly useful for catalytic processes. Again, the specific surface area of the aluminosilicate membrane appears to decrease as the ratio of alumina to silica increases. The mean pore radius of these membranes remained constant at about 22 Angstroms except for the membrane which has a ratio of 1.5 alumina to silica, which is again the mullite composition. The latter membrane has a mean pore radius of about 17 Angstroms.

The mixed aluminosilicate membranes have also been fabricated by another procedure. The two starting materials, ATSB and TMOS, were mixed and allowed to react with each other directly for one hour. An ammonium hydroxide solution having a pH of 12 was then poured into the mixture to hydrolyze the reaction product. The resulting solution was then aged by stirring at the boiling point for approximately two hours. Again, a cloudy sol was created which was centrifuged. After centrifugation, a transparent sol was obtained. The sol was again dried slowly at room temperature to create a xerogel which was again fired at maximum temperature of 500° C. The proportions of alumina to silicate in this replicate were 1:2.3. The resulting membrane had a specific surface area of 369 meters squared per gram and a mean pore radii of 10.9 Angstroms. This indicates that materials of extremely high surface area and very small pore size diameter can be achieved using the aluminosilicate system.

Because of the combination of the acidic alumina molecules and the basic silica molecules within the same membrane, it is expected that these materials will exhibit novel catalytic properties. In addition, the materials will have higher temperature stabilities than other comparable membranes made with transition metals. The materials thus combine high temperature stability, very small pore size, and a pH stability greater than that achieved with either silica or alumina membrane materials by themselves. Thus the materials seem aptly configured for applications in separation and catalysis.

We claim:

1. A microporous ceramic membrane consisting essentially of alumina and silica in respective proportions sufficient to provide a continuous membrane material having a mean pore size of less than 100 Angstroms, very good temperature stability, and a surface area in excess of 100 square meters per gram.

2. A microporous ceramic membrane as claimed in claim 1 wherein the membrane is formed of fused discrete alumina and silica particles.

3. A microporous ceramic membrane as claimed in claim 1 wherein the membrane is formed of fused aluminosilicate particles.

4. A microporous metal oxide ceramic membrane comprising fused particles consisting essentially of aluminosilicates having pores between them, the membrane having a surface area of more than 100 square meters per gram and a mean pore size of less than 100 Angstroms when exposed to temperatures up to 1000° C.

5. A method comprising making a mixed oxide ceramic membrane of alumina and silica particles having the properties of a mean pore size of less than 100 Angstroms, very good temperature stability and a surface area of more than 100 square meters per gram by the steps of
   (a) preparing a solution of alumina particles by introducing an alumina alkoxide into aqueous solution at a temperature less than 80° C., subsequently heating the solution to its boiling point, and then separating the transparent fraction of the resulting solution to obtain a clear boehmite sol;
   (b) preparing a solution of silica particles by introducing a silicon alkoxide into an aqueous solution adjusted to have an alkaline pH, and dialyzing the solution obtained until the pH falls to about 8 to obtain a silica sol;
   (c) mixing the boehmite sol and the silica sol together;
   (d) slowly evaporating the water from the mixed sols to create a xerogel; and
   (e) firing the xerogel at a firing temperature sufficient to fuse the particles in the xerogel into a microporous ceramic membrane.

6. The method of claim 5 wherein before step (c), the pH of the silica sol is adjusted to between 3.0 and 3.5 by addition of acid.

7. The method of claim 5 wherein the separating of the alumina sol in step (a) is accomplished by centrifugation.

8. The method of claim 5 wherein the firing temperature in step (e) is 500° C.

9. The method of claim 5 wherein the firing temperature in step (e) is over 1000° C.

10. A method comprising producing microporous ceramic membrane consisting essentially of aluminosilicates having the properties of a mean pore size of less than 100 Angstroms, very good temperature stability and a surface area of more than 100 square meters per gram by the steps of
   (a) mixing quantities of an aluminum alkoxide and a silicon alkoxide in separate quantities of an alcoholic solvent;
   (b) mixing the two alcoholic solutions from step (a) and allowing to react with each other;
   (c) adding a limited amount of water and acid to the solution from step (b) so as to induce hydrolysis and peptization of the solutions under conditions favoring the formation of small particles in the solution;

(d) raising the temperature of the solution to its boiling point under agitation;

(e) centrifuging the resulting solution and separating the clear fraction which is a stable clear sol;

(f) drying remaining solvent from the sol to create a xerogel; and (g) firing the xerogel at a firing temperature sufficient to fuse the particles in the xerogel into a microporous ceramic membrane.

* * * * *

UNITED STATES PATENT AND TRADEMARK OFFICE
CERTIFICATE OF CORRECTION

PATENT NO. : 5,268,101
DATED : December 7, 1993
INVENTOR(S) : Marc A. Anderson
Guangyao Sheng It is certified that error appears in the above-identified patent and that said Letters Patent is hereby corrected as shown below:

In Column 1, in the Specification, after the title, insert the following text:

--STATEMENT REGARDING FEDERALLY SPONSORED RESEARCH

This invention was made with United States Government support awarded by the Department of Energy (DOE), Grant No. DE-FG07-91-ID13062. The United States Government has certain rights in this invention.--

Signed and Sealed this

Twenty-eight Day of March, 1995

*Attest:*

BRUCE LEHMAN

*Attesting Officer*     Commissioner of Patents and Trademarks